United States Patent
Nishida et al.

(10) Patent No.: US 6,529,392 B2
(45) Date of Patent: Mar. 4, 2003

(54) SWITCHING POWER SUPPLY UNIT

(75) Inventors: Akio Nishida, Kyoto (JP); Ryota Tani, Nagaokakyo (JP); Koji Nakahira, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 09/948,281

(22) Filed: Sep. 6, 2001

(65) Prior Publication Data

US 2002/0027787 A1 Mar. 7, 2002

(30) Foreign Application Priority Data

Sep. 6, 2000 (JP) ............................... 2000-270513

(51) Int. Cl.[7] .................................. H02M 3/335
(52) U.S. Cl. ........................... 363/21.16; 363/97
(58) Field of Search ...................... 363/20, 21.01, 363/21.12, 21.13, 21.15, 21.16, 56.01, 56.09, 97, 131

(56) References Cited

U.S. PATENT DOCUMENTS

| | | | | |
|---|---|---|---|---|
| 5,995,382 A | * | 11/1999 | Miyazaki et al. | 363/19 |
| 5,995,385 A | * | 11/1999 | Shimanmura | 363/56 |
| 6,081,433 A | * | 6/2000 | Nishida et al. | 363/19 |
| 6,198,637 B1 | * | 3/2001 | Hosotani et al. | 363/19 |
| 6,285,566 B1 | * | 9/2001 | Nakahira et al. | 363/19 |
| 6,295,211 B1 | * | 9/2001 | Nishida et al. | 363/19 |
| 6,366,480 B2 | * | 4/2002 | Hosotani et al. | 363/21.14 |
| 6,433,443 B2 | * | 8/2002 | Nishida et al. | 307/35 |

FOREIGN PATENT DOCUMENTS

| | | |
|---|---|---|
| EP | 0933866 | 8/1999 |
| EP | 0935333 | 8/1999 |
| EP | 1150417 | 10/2001 |
| JP | 7245949 | 9/1995 |
| JP | 8116671 | 5/1996 |
| JP | 0197360 | 12/1998 |

\* cited by examiner

*Primary Examiner*—Adolf Deneke Berhane
(74) *Attorney, Agent, or Firm*—Keating & Bennett, LLP

(57) ABSTRACT

An RCC type switching power supply unit with a transformer having a primary winding, a secondary winding, and a feedback winding, a main switching element receiving a feedback signal from the feedback winding and for turning on and off the current of the primary winding, a rectifying and smoothing circuit having a rectifying element and a smoothing element connected to the secondary winding, and a control circuit connected between the feedback winding and the control terminal of the main switching element. A delay circuit by which the turning on of the main switching element is prohibited for a certain period of time after the current of the rectifying element has become zero and a switching circuit by which the delay time of the delay circuit is changed by two or more stages are provided.

22 Claims, 8 Drawing Sheets

SWITCHING POWER SUPPLY UNIT

BACKGROUND OF THE INVENTION

1. Field of the Invention

The present invention relates to a ringing choke converter type switching power supply unit.

2. Description of the Related Art

Up to now, a ringing choke converter (hereinafter, referred to as RCC) type switching power supply unit has been known for use as a switching power supply unit. This RCC type switching power supply unit is to provide a stabilized DC power supply using a commercially available AC power supply, and, as the construction is relatively simple and the power supply unit is small-sized, light-weight, and highly efficient, it is widely used in various devices such as electronic computers, communication devices, office automation equipment, etc. Furthermore, this type of power supply unit is also utilized as an auxiliary unit and a pre-regulator in small capacity series regulators.

FIG. 8 is a circuit diagram of a conventional RCC type switching power supply unit. As shown in the drawing, the switching power supply unit 10 is composed of an input circuit 2, a DC-DC converter circuit 3, a voltage detector circuit 4, and a control circuit 5.

The input circuit 2 is composed of a fuse F, a filter circuit LF, and a rectifying diode bridge DB, and an alternating-current power supply AC is connected to the input terminals. Furthermore, one input terminal of the input circuit 2 is connected to one end of the input-side of the filter circuit LF through the fuse F and the other input terminal of the input circuit 2 is directly connected to the other end of the input side of the filter circuit LF. Furthermore, the terminals on the output side of the filter circuit LF are connected to respective input terminals of the diode bridge DB. The output terminals a and b of the diode bridge DB are connected to the input terminals a and b of the DC—DC converter circuit 3.

The DC—DC converter circuit 3 is composed of capacitors C1 and C4, a transformer T, a main switching element such as MOS field-effect transistor (FET) Q1 as resistors R1 and R10, and a diode D1. Furthermore, the transformer T contains a primary winding N1, a secondary winding N2 which is opposite in polarity to the primary winding N1, and a feedback winding Nb which is the same in polarity as the primary winding N1. The smoothing capacitor C1 is provided between the input terminals a and b of the DC—DC converter circuit 3, and also a series circuit of the primary winding N1 and the FET Q1 is provided so as to be parallel to the capacitor C1. Thus, the starting point of the primary winding N1 of the transformer T is connected to the input terminal a of the DC—DC converter circuit 3, the drain of the FET Q1 is connected to the end of the primary winding N1, and the source of the FET Q1 is connected to the input terminal b of the DC—DC converter circuit 3. Furthermore, one end of the starter resister R1 is connected to the starting point of the primary winding N1, and the other end of the resistor R1 is connected to the gate of the FET Q1. The resistor R10 is connected between the gate and the source of the FET Q1. Moreover, the anode of the rectifying diode D1 is connected to the end of the secondary winding N2 of the transformer T, and the smoothing capacitor C4 is connected between the cathode of the diode D1 and the starting point of the secondary winding N2. The diode D1 and capacitor C4 constitute a rectifying and smoothing circuit.

The voltage detector circuit 4 is provided on the output side of the DC—DC converter circuit 3, and is composed of resistors R5, R6, and R7, a light-emitting diode PD as a light-emitting device of a photo coupler PC, and a shunt regulator Sr. The output terminals of the voltage detector circuit 4 are provided so as to be parallel to the capacitor C4 of the DC—DC converter circuit 3. Furthermore, each of a series circuit of the resistor R5, the light-emitting diode PD, and the shunt regulator Sr, and a series circuit of the resistors R6 and R7 is provided so as to be parallel to the capacitor C4. Moreover, the cathode of the light-emitting diode PD and the cathode of the shunt regulator Sr are connected. Furthermore, the reference terminal of the shunt regulator Sr is connected to the connection point between the resistors R6 and R7.

The control circuit 5 is composed of resistors R2, R3, R4, and R13, capacitors C2 and C3, a diode D2, a phototransistor PT as a light receiving element of a photo coupler PC, and an NPN transistor Q2. The capacitor C3 and the resistor R13 are connected in series between the gate of the FET Q1 of the DC—DC converter circuit 3 and the starting point of the feedback winding Nb. Furthermore, the collector and the emitter of the transistor Q2 are connected to the gate and the source of the FET Q1, respectively. Moreover, a series circuit of the resistor R2 and the resistor R3 is connected between the starting point and the end of the feedback winding Nb. In addition, a series circuit of the resistor R4, the diode D2, and the phototransistor PT in the photo coupler PC is connected so as to be parallel to the resistor R2. Moreover, the cathode of the diode D2 is connected to the collector of the phototransistor PT in the photo coupler PC. Furthermore, the capacitor C2 is connected between the base and the emitter of the transistor Q2, and the above resistor R3 is connected so as to be parallel to the capacitor C2.

Next, the operation of the switching power supply unit 10 constructed as in the above is described. First, at the start where the power supply is turned on, a voltage is applied to the gate of the FET Q1 through the starter resistor R1 and the FET Q1 is turned on. In this way, the voltage of the power supply is applied to the primary winding N1 of the transformer T and a voltage having the same polarity as that of the primary winding N1 is generated in the feedback winding Nb. This voltage signal as a positive feedback signal is provided to the gate of the FET Q1 through the resistor R13 and the capacitor C3, and the FET Q1 is quickly turned on. At this time, an excitation energy is stored in the primary winding N1.

A charging current flows into the capacitor C2 through the resistor R2 because of the electromotive force in the feedback winding Nb. When the charging voltage of the capacitor C2 exceeds the forward voltage drop between the base and the emitter of the controlling transistor Q2, the transistor Q2 is turned on. In this way, the voltage between the gate and the source of the FET Q1 becomes substantially zero thereby to turn off the FET Q1.

Thus, the excitation energy stored in the primary winding N1 of the transformer T during the ON-state period of the FET Q1 is discharged as electric energy through the secondary winding N2, rectified by the diode D1, smoothed by the capacitor C4, and supplied to the load (not shown in the drawing) which is connected to the output terminals of the voltage detector circuit 4.

When the electric charge in the charged capacitor C2 is discharged through a discharge circuit of the resistor R3, etc., and the charged voltage becomes equal to or less than the forward voltage drop between the base and the emitter of the transistor Q2, the transistor Q2 is turned off. Furthermore, when the excitation energy stored in the primary winding N1 of the transformer T is discharged through the secondary winding N2 and the current flowing through the diode D1 becomes zero, a kickback voltage is generated in the feedback winding Nb in which the starting point of the winding is positive polarity and the FET Q1 is turned on by the kickback voltage once again. When the FET Q1 is turned on, a voltage is provided to the primary winding N1 of the transformer T again, and an excitation energy is stored in the primary winding N1.

Thus, the above-described oscillation is repeated in the switching power supply unit 10.

Next, the feedback control by the voltage detector circuit 4 is described. Under normal conditions, the output voltage on the load side is detected by a voltage divider of the resistors R6 and R7, and the detected voltage and the reference voltage of the shunt regulator Sr are compared. The changes of the output voltage are amplified by the shunt regulator Sr, a current passing through the light-emitting diode PD of the photo coupler PC changes, and the amount of light emission of the light-emitting diode PD also changes. Furthermore, in accordance with the amount of light received by the phototransistor PT of the photo coupler PC, the impedance of the phototransistor PT changes and accordingly the charging time constant of the capacitor C2 changes. The more the output voltage decreases, the larger the above charging time constant becomes, and accordingly the more the output voltage decreases, the longer the period from the turn on to the forcible turn off, caused by the transistor Q2, of the FET Q1, that is, the ON-state period of the FET Q1, increases, forcing the output voltage to increase. Furthermore, when the output voltage increases, the condition is reversed and the output voltage is forcibly reduced. In this way, a constant-voltage control is achieved so that the output voltage may be constant.

Moreover, the conditions of a light load correspond to the cases where the above-mentioned output voltage increases, and the conditions of a heavy load correspond to the cases where the above output voltage decreases.

In the conventional RCC type switching power supply unit shown in FIG. 8, it is known that the oscillation frequency of the FET Q1 changes substantially inversely with the input power or output power. This is shown by (b) in FIG. 5, that is, shown as the relationship of the oscillation frequency (switching frequency) to the output (load power).

Generally, as the load becomes lighter, the switching loss is reduced for each switching operation, but, as shown by (b) in FIG. 5, the smaller the output power is, that is, the lighter the load is, the higher the oscillation frequency becomes, and then the higher the oscillation frequency becomes, the greater the number of switching operations and accordingly, switching losses increase. As a result, even if the load becomes lighter, the degree of reduction of the switching losses is very little. Therefore, the lighter the load is, the more the efficiency of the power supply unit is reduced.

In order to reduce the switching loss under such light-load conditions, the circuit constants may be designed so that the oscillation frequency becomes lower at the rated load, but when the power supply unit is required to cope with a wide range of very light loads to heavy loads, it is unavoidable that the oscillation frequency becomes relatively higher at a light load. That is, generally the oscillation frequency at the rated load is mainly determined by effects in the parts such as the magnetic flux density of the transformer and of ripples, noise, etc., and if the oscillation frequency is made too low, there is a problem in that the saturation of the transformer, etc., are caused.

Furthermore, when the device using the conventional RCC type switching power supply unit is on standby, that is, at the above-mentioned light load, as the oscillation frequency becomes higher, heat generation is caused in the main switching element because of the switching losses.

For example, in the switching power supply unit used in a printer, when the power switch is in the OFF-state, it is possible to operate the power source in an optimized operation mode during standby by using a switching signal. On the other hand, once the power switch of the printer is turned on for printing, etc., the switching power supply unit returns to the optimized operation mode for normal work. Furthermore, when the power switch of the printer is in the ON-state, if printing is not performed, there is a waiting time. Because the printer is light-loaded during this waiting time, heat is generated in the main switching element of the switching power supply unit used in the printer as described above.

Regarding this problem, in Japanese Unexamined Patent Application Publication No. 11-235036, the inventors of the application concerned have disclosed a technology concerning a switching power supply unit in which the loss on standby is improved by inputting a switching signal on standby and reducing the oscillation frequency.

Furthermore, in Japanese Patent Application No. 11-253550, the inventors of the application concerned have proposed a technology concerning a switching power supply unit in which the loss on standby is improved by continuously lowering the oscillation frequencies at the rated range of use on standby.

However, in the switching power supply unit disclosed in Japanese Unexamined Patent Application Publication No. 11-235036, when the switching signal is for normal operation, the power supply unit functions as an RCC. Therefore, when the power supply unit is on standby as in the above-described printer, no means for reducing the loss is provided and there is a problem in that the increase of the input power and heat generation in the main switching element are caused. Furthermore, there is also an operation of an intermittent oscillation and in this case there is a problem in that the output ripple voltage increases.

Furthermore, in the switching power supply unit proposed in Japanese Patent Application No. 11-253550, when the power supply unit is lightly-loaded, the oscillation frequency is automatically reduced. In this case, when the oscillation frequency is reduced too much, the response characteristic of the load worsens, and accordingly the frequency is limited to high frequencies when compared to the technology described in Japanese Unexamined Patent Application Publication No. 11-235036. Because of this, there is a problem in that the effect of lowering the loss is inferior to a switching signal input type.

SUMMARY OF THE INVENTION

The present invention is to solve the above-mentioned problems, and it is an object of the present invention to provide an RCC type switching power supply unit in which by lowering or keeping the oscillation frequency substantially at a constant value at a light load and on standby and thus avoiding the increase of the oscillation frequency, the suppression of the standby power, the suppression of heat generation of the main switch, the standby efficiency of the RCC, and the improvement of the output ripple voltage caused by the intermittent oscillation are objectives, and in which by switching the operation mode by an external signal or switching the operation mode after a certain period of time after the load current has become on standby, the oscillation frequency is further lowered and the loss on standby is greatly reduced.

The ringing choke converter type switching power supply unit of the present invention comprises a transformer having a primary winding, a secondary winding, and a feedback winding; a main switching element receiving a feedback signal from the feedback winding and turning on and off the current of the primary winding; a rectifying and smoothing circuit comprising a rectifying element and a smoothing element, being connected to the secondary winding; and a control circuit connected between the feedback winding and the control terminal of the main switching element, a delay circuit for prohibiting the turning on of the main switching element for a certain period of time after the current flowing through the rectifying element has become zero is provided, and a switching circuit for switching the delay time of the delay circuit in two stages or more than two stages is provided.

According to this construction, the turning on of the main switching element is prohibited for a certain period of time by the delay circuit and the OFF-state period is extended. Furthermore, the delay time can be switched in two stages or more than two stages by the switching circuit. Therefore, the switching frequency of the main switching element is lowered when compared to the cases where such a delay circuit is not used. Furthermore, it becomes possible to set the switching frequency of the main switching element at a desired value by the switching circuit.

Furthermore, in the switching power supply unit of the present invention, the delay circuit contains a switching device and a time constant circuit which are provided between the feedback winding of the transformer and the control terminal of the main switching element is provided, and a switching circuit for switching the time constant of the time constant circuit is provided. In this way, the ON-state period of the switching device changes in accordance with the time constant of the time constant circuit, and it becomes possible to switch the time constant of the time constant circuit by the switching circuit.

Moreover, in the switching power supply unit of the present invention, an output power detector circuit for rectifying and smoothing the voltage of the feedback winding of the transformer by a rectifying element and a smoothing element is provided, and a delay time extension circuit connected between the output power detector circuit and the control terminal of the delay circuit through a resistor element is provided.

In addition, in the switching power supply unit of the present invention, the switching circuit can be switched by an external signal. In this way, it becomes possible to externally switch the switching frequency of the main switching element easily.

Furthermore, in the switching power supply unit of the present invention, a current detector circuit for detecting the current flowing through the secondary winding is provided, and the switching circuit for switching the delay time of the delay circuit after a certain period of time when the current detector circuit detects the load current or load power being on standby is provided. Thus, it becomes possible to switch the switching frequency of the main switching element automatically.

BRIEF DESCRIPTION OF THE DRAWING(S)

DETAILED DESCRIPTION OF EMBODIMENTS OF THE INVENTION

First Embodiment

Figure 1:
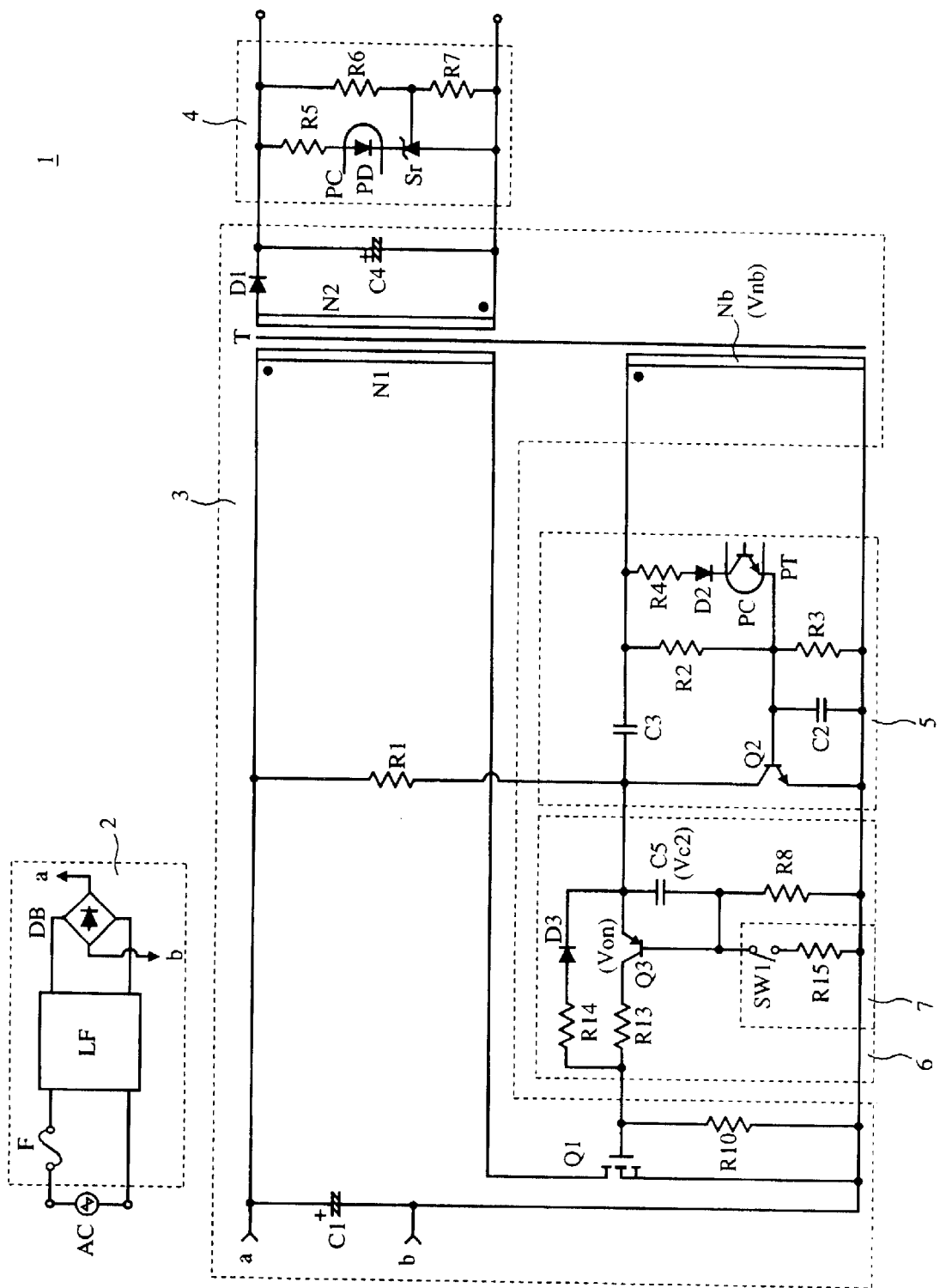
FIG. 1 is a circuit diagram showing a switching power supply unit according to a first embodiment of the present invention.
Figure 8:
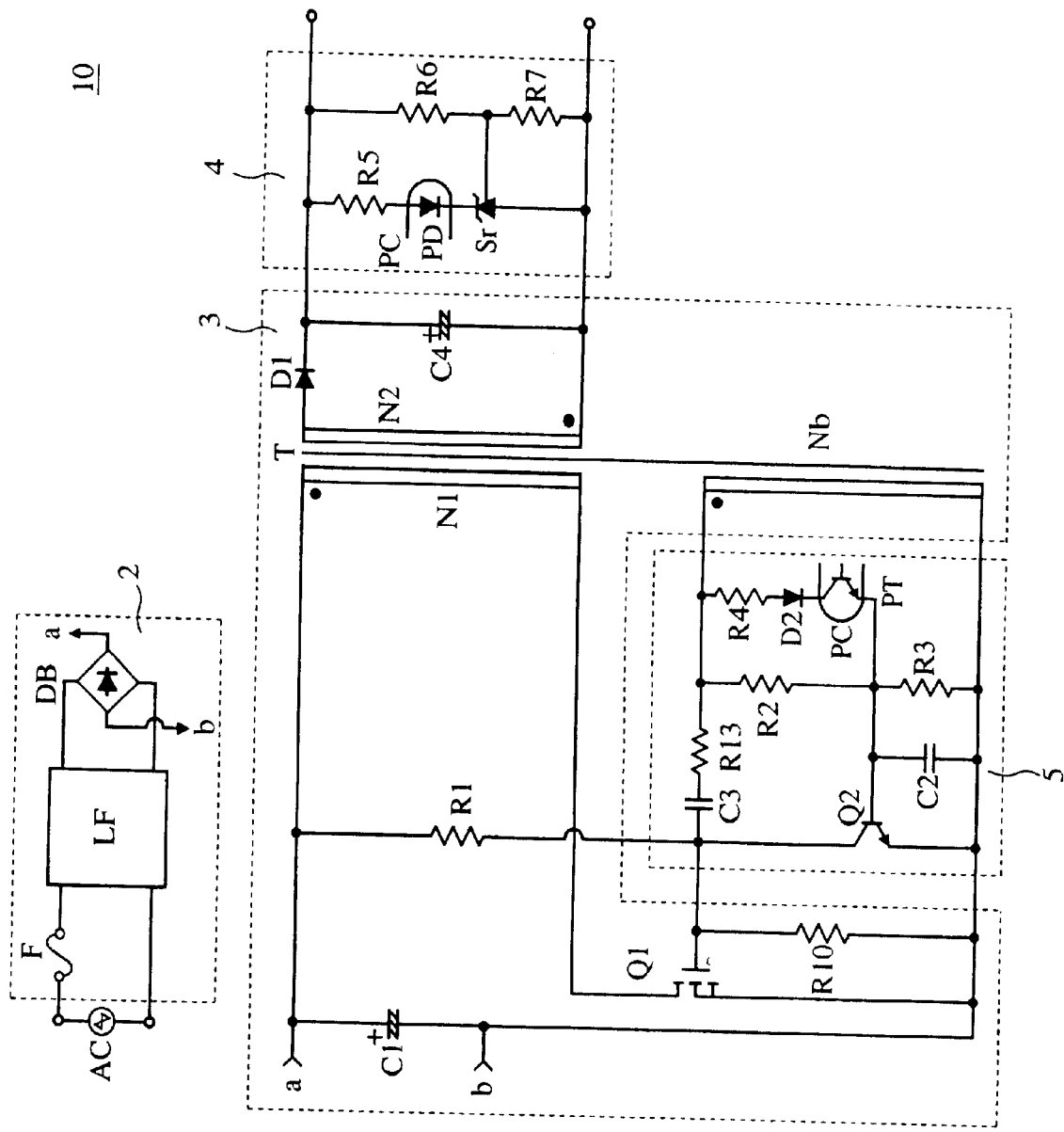
FIG. 8 is a circuit diagram of a conventional RCC type switching power supply unit.

The construction of an RCC type switching power supply unit according to a first embodiment of the present invention is described in accordance with FIG. 1. FIG. 1 is a circuit diagram showing the switching power supply unit according to a first embodiment of the present invention. Moreover, in the switching power supply unit 1 shown in the drawing, a delay circuit 6 and a delay-time switching circuit 7 are added to the switching power supply unit 10 shown in FIG. 8, and the other circuits are the same as those shown in FIG. 8. Therefore, the same parts are given the same reference numerals, and their detailed description is omitted.

In the illustrative embodiment of FIG. 1, the delay circuit 6 in the switching power supply unit 1 is provided between the DC—DC converter circuit 3 and the control circuit 5, and is composed of resistors R8, R13, and R14, a capacitor C5, a diode D3, and a PNP transistor Q3 as a switching device. Moreover, the resistor R13 has been transferred to the delay circuit 6 from the control circuit 5 in FIG. 8. In the delay circuit 6, a series circuit of the resistor R13 and the transistor Q3 and a series circuit of the resistor R14 and the diode D3 are provided in parallel between the gate as a control terminal of the FET Q1 in the DC—DC converter circuit 3 and the capacitor C3 in the control circuit 5. Moreover, in the above delay circuit 6, one end of the resistor R13 and the collector of the transistor Q3 are connected, and one end of the resistor R14 and the anode of the diode D3 are connected. Furthermore, the capacitor C5 and the resistor R8 are connected in series, and these are connected between the collector and the emitter of the transistor Q2 in the control circuit 5. The capacitor C5 and the resistor R8 constitute a time constant circuit. The base of the transistor Q3 is connected to the connection point of the capacitor C5 and the resistor R8, and the capacitor C5 is provided between the base and the emitter of the transistor Q3.

The delay time switching circuit 7 is provided in the delay circuit 6 and is composed of a switch SW1 and a resistor R15. A series circuit of the switch SW1 and the resistor R15 is connected so as to be parallel to the resistor R8 in the delay circuit 6. Usually the switch SW1 is on.

Next, the operation of the thus constructed switching power supply unit 1 is described. Moreover, the main part of the total operation is described here.

First, when a voltage is applied to the gate of the FET Q1 and the FET Q1 is turned on, a power-supply voltage is applied to the primary winding N1 of the transformer T and a voltage having the same polarity as that in the primary winding N1 is generated in the feedback winding Nb. This voltage signal as a positive feedback signal is provided to the gate of the FET Q1 through the capacitor C3, the transistor Q3 which is turned on, and the resistor R13, and the FET Q1 is quickly turned on. At this time, an excitation energy is stored in the primary winding N1.

A charging current also flows into the capacitor C2 through the resistor R2 by the electromotive force of the feedback winding Nb. When the charging voltage of the capacitor C2 exceeds the forward voltage drop between the base and the emitter of the transistor Q2, the transistor Q2 is turned on. Because of this, the voltage between the gate and the source of the FET Q1 becomes substantially zero and, as a result, the FET Q1 is turned off.

Thus, the excitation energy stored in the primary winding N1 of the transformer T while the FET Q1 is turned on is discharged as electrical energy through the secondary winding N2, rectified by the diode D1, smoothed by the capacitor C4, and supplied to a load, which is not shown in the drawing, connected to the output terminals of the voltage detector circuit 4.

When the electric charge in the charged capacitor C2 is discharged through the discharge circuit comprising the resistor R3, etc., and the charged voltage of the capacitor C2 becomes lower than the forward voltage drop between the base and the emitter of the transistor Q2, the transistor Q2 is turned off. Furthermore, when the whole excitation energy stored in the primary winding N1 of the transformer T is discharged through the secondary winding N2 and the current flowing through the diode D1 becomes zero, the capacitor C5 is charged by a kickback voltage Vnb generated in the feedback winding Nb.

When the charged voltage Vc2 of the capacitor C5 reaches the voltage Von at which the transistor Q3 is turned on, the transistor Q3 is turned on, a voltage is applied to the gate of the FET Q1, and the FET Q1 is turned on.

As described above, the turning on of the FET Q1 can be delayed until the charged voltage Vc2 of the transistor Q2 in the delay circuit 6 reaches the voltage Von. Moreover, the period up to the turning on of the transistor Q3 is determined by the time constant of the time constant circuit comprising the capacitor C5 and the parallel connection of the resistor R8 and the resistor R15.

When the resistor R15 is disconnected from the resistor R8 by the turning off of the switch SW1 in the delay-time switching circuit 7, the time constant is determined by the capacitor C5 and the resistor R8. Therefore, the delay time for the turning on of the FET Q1 is extended. In this way, the turning on of the FET Q1 is delayed and the OFF-state period of the FET Q1 is extended.

In this way, a substantially constant oscillation frequency can be maintained at a light load because of the delay circuit 6, and, by avoiding an increase in the switching frequency, the efficiency of the RCC during standby can be improved or the output ripple voltage can be improved. Furthermore, by the turning on and off of the switch SW1 in the delay-time switching circuit 7, the delay time until the turning on of the FET Q1 can be adjusted and the efficiency at a light load can be greatly improved.

Second Embodiment

Figure 2:
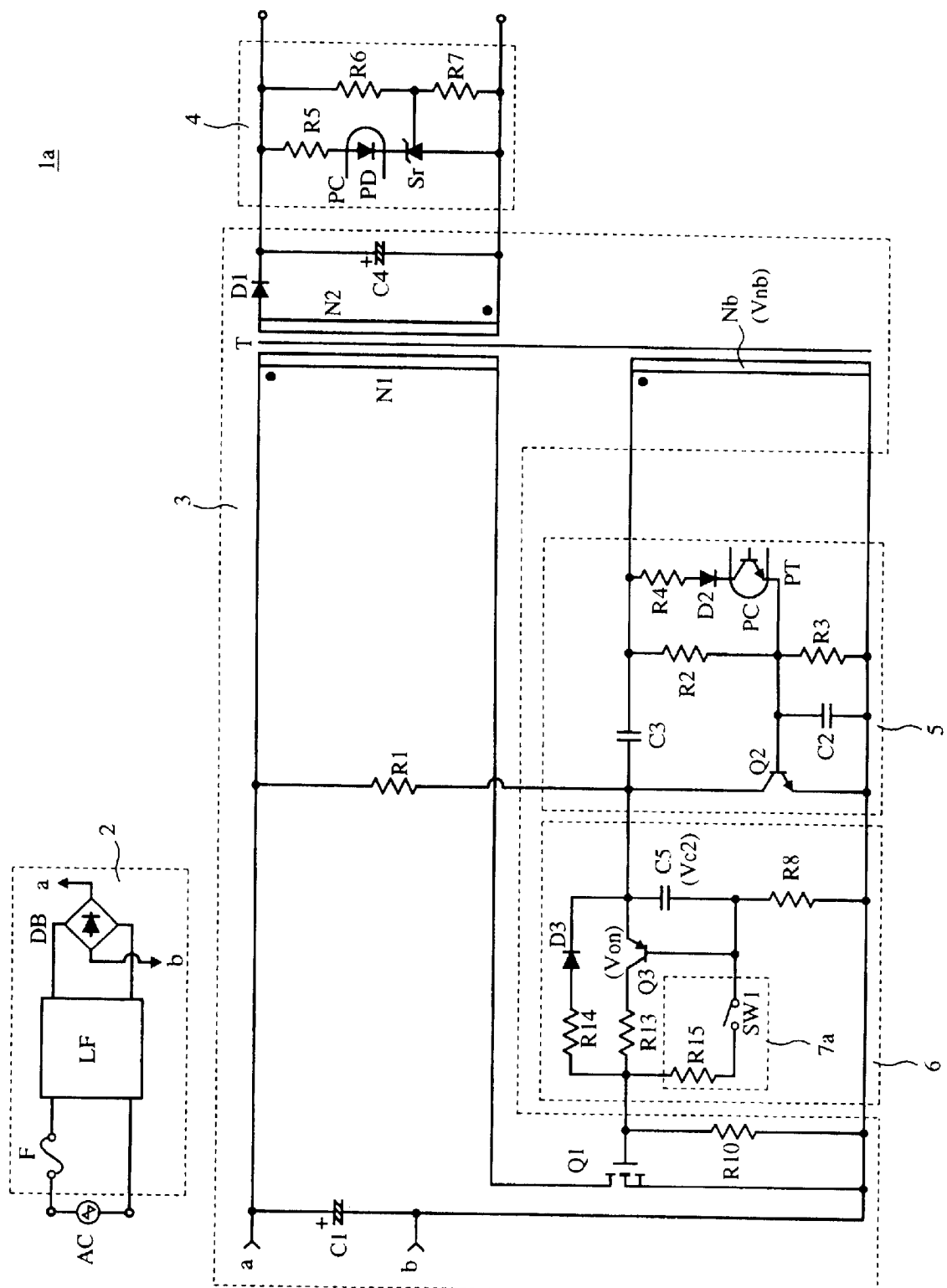
FIG. 2 is a circuit diagram showing a switching power supply unit according to a second embodiment of the present invention.

Next, the construction of an RCC type switching power supply unit according to a second embodiment of the present invention is described in accordance with FIG. 2. FIG. 2 is a circuit diagram showing the switching power supply unit according to a second embodiment of the present invention. In FIG. 2, the delay circuit 6 of the switching power supply unit 1a is constructed in substantially the same way as the delay circuit 6 of the switching power supply unit 1 shown in FIG. 1. Furthermore, a delay-time switching circuit 7a in the switching power supply unit 1a is composed of the switch SW1 and the resistor R15. In a series circuit of the switch SW1 and the resistor R15, one end of the resistor R15 is connected to the gate of the FET Q1 in the DC—DC converter circuit 3, and one end of the switch SW1 is connected to the base of the transistor Q3 in the delay circuit 6.

The switching power supply unit 1a constructed in this way operates in the same way as the switching power supply unit 1. Accordingly, a substantially constant oscillation frequency can be maintained at a light load, and, by avoiding increase in the switching frequency, the efficiency of the RCC on standby can be improved or the output ripple voltage can be improved, and at the same time the efficiency at a light load can be greatly improved by the turning on and off of the switch SW1.

Furthermore, because, in the switching power supply unit 1a, the delay-time switching circuit 7a is provided at a location shown in FIG. 2, when the resistor R15 has a low resistance, the switching power supply unit 1a has the following effect in comparison with the switching power supply unit 1. That is, when the switching power supply unit 1 is started while the switch SW1 of the delay-time switching circuit 7 is switched on, there are cases where the FET Q1 cannot be turned on and accordingly the switching power supply unit 1 cannot be started. This is because, as the voltage between the gate and the source of the FET Q1 is determined by a ratio between the composite resistance of the parallel-connected resistors R8, R15, and R10 and the resistance of the resistor R1, the voltage between the gate and the source of the FET Q1 does not reach the threshold level.

On the other hand, because, in the switching power supply unit 1a, the delay-time switching circuit 7a is provided at a location shown in FIG. 2, the switching power supply unit 1a can be started, even if the switching power supply unit 1a is started while the switch SW1 is on. This is because, as a series circuit of the resistor R15 and the resistor R10 is connected in parallel to the resistor R8 with the switch SW1 switched on, the voltage between the gate and the source of the FET Q1 is not adversely affected by the resistor R15, even if the resistor R15 has a low resistance. Accordingly, the voltage between the gate and the source of the FET Q1 reaches the threshold level to turn on the FET Q1 even with switch SW1 turned on.

Third Embodiment

Figure 3:
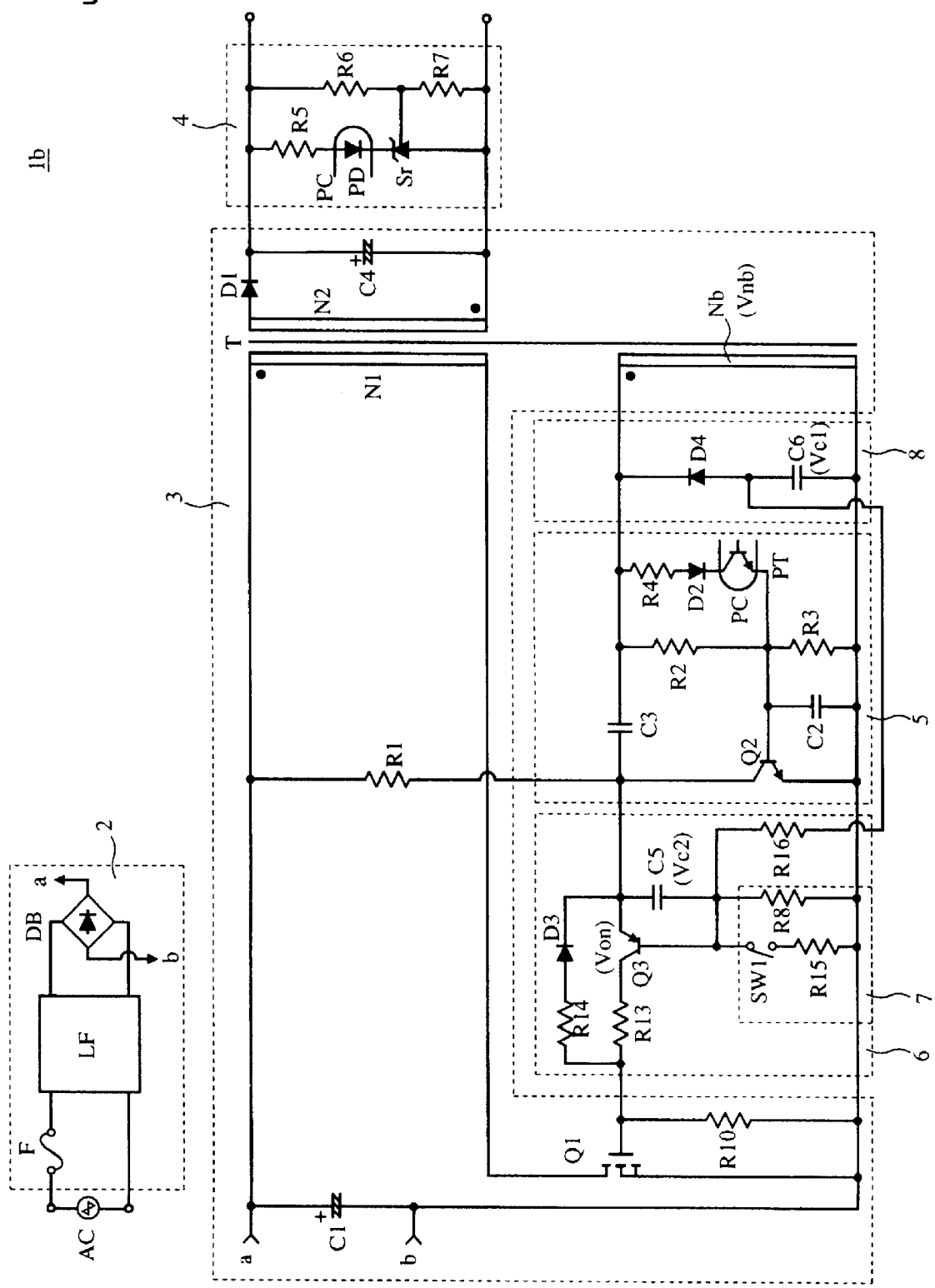
FIG. 3 is a circuit diagram showing a switching power supply unit according to a third embodiment of the present invention.

Next, the construction of an RCC type switching power supply unit according to a third embodiment of the present invention is described in accordance with FIG. 3. FIG. 3 is a circuit diagram showing the switching power supply unit according to a third embodiment of the present invention. In the switching power supply unit 1b shown in FIG. 3, an output power detector circuit 8 and a resistor element (impedance) connecting the delay-time switching circuit 7 and the output power detector circuit 8 are added to the switching power supply unit 1 shown in FIG. 1, and the other circuits are the same as those shown in FIG. 1. Accordingly, the same parts are given the same reference numerals, and their detailed description is omitted.

In FIG. 3, the output power detector circuit 8 of the switching power supply unit 1b is provided between the feedback winding Nb of the DC—DC converter circuit 3 and the control circuit 5, and the series circuit is composed of a diode D4 as a rectifying element and a capacitor C6 as a smoothing element. The diode D4 and the capacitor C6 are connected in series, and is provided between both terminals of the feedback winding Nb. That is, the cathode of the diode D4 is connected to the starting point of the feedback winding Nb and one end of the capacitor C6 is connected to the end of the feedback winding Nb.

Furthermore, in the delay circuit 6, one end of a resistor R16 as a resistance element is connected to the connection point of the capacitor C5 and the resistor R8, and the other end of the resistor R16 is connected to the connection point of the diode D4 and the capacitor C6 in the output power detector circuit 8.

Next, the operation of the thus constructed switching power supply unit 1b is described. Moreover, the main part of the switching power supply unit 1b is described here.

First, a voltage is applied to the gate of the FET Q1 and the FET Q1 is turned on. Because of this, the voltage of the power supply is applied to the primary winding N1 of the transformer T and a voltage of the same polarity as that in the primary winding N1 is generated in the feedback winding Nb. This voltage signal as a positive feedback signal is provided to the gate of the FET Q1 through the capacitor C3, the transistor Q3, and the resistor R13, and the FET Q1 is quickly turned on. At this time, an excitation energy is stored in the primary winding N1.

A charging current also flows into the capacitor C2 through the resistor R2 because of the electromotive force in the feedback winding Nb. When the charging voltage of the capacitor C2 exceeds the forward voltage drop between the base and the emitter of the controlling transistor Q2, the transistor Q2 is turned on. Thus, the voltage between the gate and the source of the FET Q1 becomes substantially zero and the FET Q1 is turned off.

When the OFF-state period of the FET Q1 starts, the capacitor C6 in the output power detector circuit 8 is charged by a voltage generated in the feedback winding Nb of the transformer T. Furthermore, the excitation energy stored in the primary winding N1 of the transformer T during the ON-state period of the FET Q1 is discharged as electric energy through the secondary winding N2, rectified by the diode D1, smoothed by the capacitor C4, and supplied to a load, not shown in the drawing, connected to the output terminal of the voltage detector circuit 4.

Then, when the electric charge in the charged capacitor C2 is discharged through the discharge circuit comprising the resistor R3, etc., and the charged voltage becomes lower than the forward voltage drop between the base and the emitter of the transistor Q2, the transistor Q2 is turned off. Furthermore, the whole excitation energy stored in the primary winding N1 of the transformer T is discharged through the secondary winding N2 and the current flowing through the diode D1 becomes zero, the charged voltage Vc1 of the capacitor C6 is discharged, a voltage is applied to the emitter of the transistor Q3 by the charged voltage Vc1 and the voltage Vnb generated in the feedback winding Nb, and the capacitor C5 in the delay circuit 6 is charged. When the switch SW1 is on, the voltage of the capacitor C5 increases in accordance with the time constant of the capacitor C5, the parallel connection of the resistor R8 and resistor R15, and the resistor R16 in series with capacitor C6.

Figure 4:
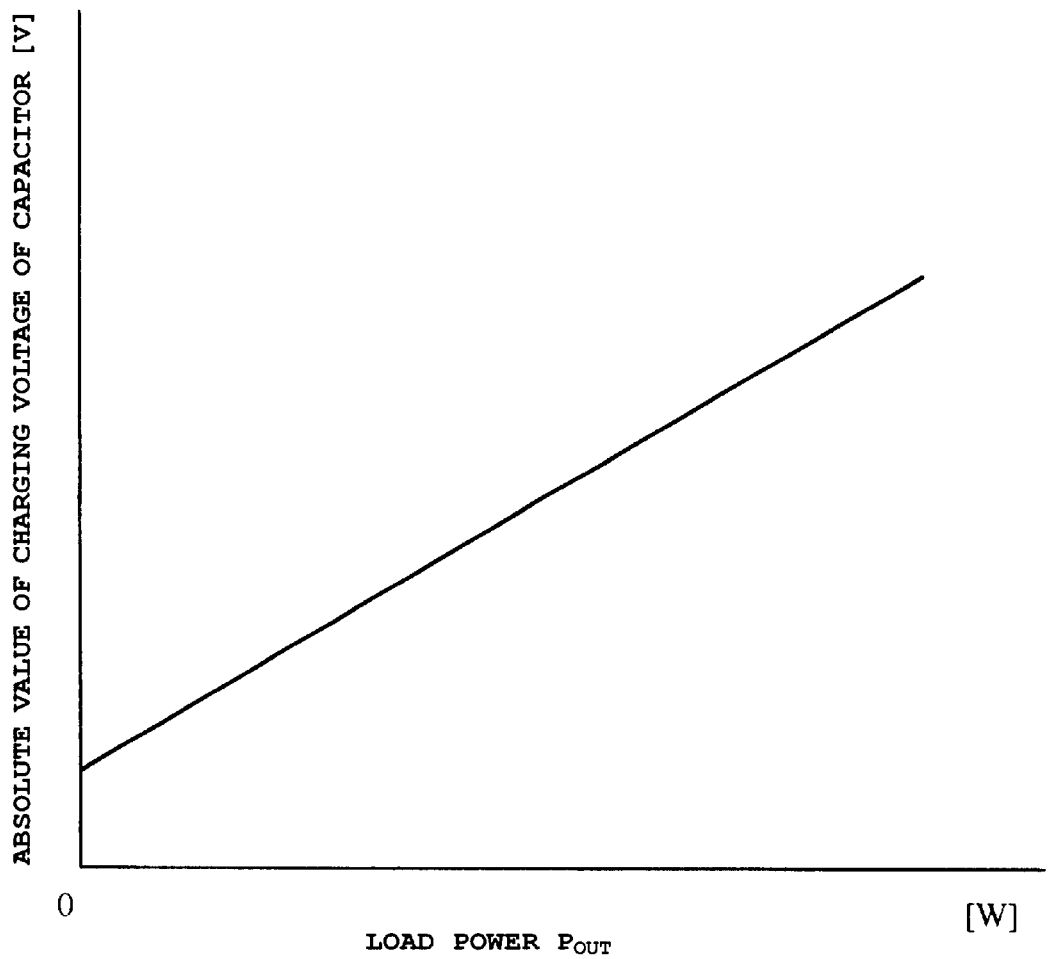
FIG. 4 is a graph showing the change of the absolute value of the charging voltage of a capacitor constituting the output power detector circuit on the primary winding side of the switching power supply unit shown in FIG. 3.

FIG. 4 is a graph showing the change of the absolute value of a charging voltage Vc1 of the capacitor C6 constituting the output power detector circuit 8 on the primary winding side of the switching power supply unit 1b shown in FIG. 3.

Here, the absolute value of the charging voltage Vc1 increases in proportion to the load power of the switching power supply unit 1b because of the influence of the leakage inductance of the transformer T, etc., as shown in FIG. 4.

Therefore, at a light load, the absolute value of the charging voltage Vc1 of the capacitor C6 is relatively small, and the time required until the charging voltage Vc2 of the capacitance C5 constituting the time constant circuit reaches the voltage Von at which the transistor Q3 is turned on becomes longer. Because of this, the turning on of the FET Q1 is delayed and the OFF-state period of the FET Q1 is extended, and, as a result, the switching frequency of the FET Q1 is lowered. On the other hand, at a heavy loading, the absolute value of the charging voltage Vc1 of the capacitor C6 becomes relatively large, and the time required until the charging voltage Vc2 of the capacitor C5 reaches the voltage Von at which the transistor Q3 is turned on becomes shorter. Thus, the turning on of the FET Q1 is quickened and the OFF-state period of the FET Q1 is shortened.

Because the capacitor C6 as a voltage source is disposed in the path of the capacitor C5 and the resistor R16, the larger the absolute value of the voltage of the capacitor C6 is, the more quickly the voltage of the capacitor C5 increases.

When the charging voltage Vc2 of the capacitor C5 reaches the voltage Von, the transistor Q3 is turned on, a voltage is applied to the gate of the FET Q1, and the FET Q1 is turned on.

In this way, the turning on of the FET Q1 can be delayed until the charging voltage Vc2 of the transistor Q2 in the delay circuit 6 reaches the voltage Von.

When the resistor R15 is disconnected from the resistor R8 by the turning off of the switch SW1 in the delay-time switching circuit 7, the time constant is determined by the capacitor C5 and the resistor R8. Accordingly, the delay time until the FET Q1 is turned on is extended. Because of this, the turning on of the FET Q1 is delayed and the OFF-state period of the FET Q1 is extended.

Figure 5:
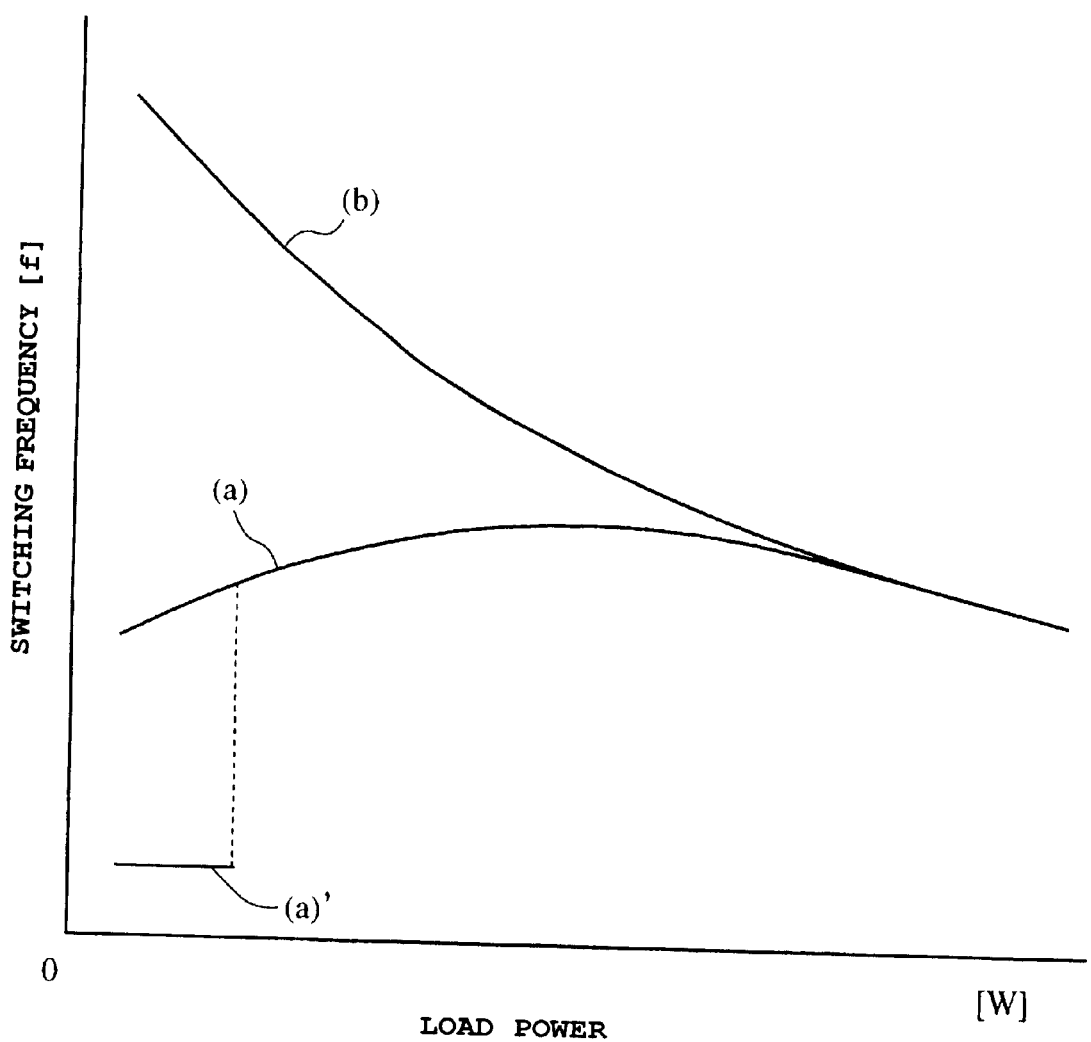
FIG. 5 is a graph showing the change of the switching frequency of a switching power supply unit of the present invention and a conventional one.

Here, the change of the switching frequency which is a consequence of the increase of the load power of the switching power supply unit 1b is shown in FIG. 5. FIG. 5 is a graph showing the change of the switching frequency in the switching power supply unit of the present invention and a conventional one. In FIG. 5, (a) and (a)' show the change of the switching frequency of the switching power supply unit 1b and (b) shows the change of the switching frequency of the conventional switching power supply unit 10. The frequency (a) of the switching power supply unit of the present invention is particularly low at a light load compared with the frequency (b) of the conventional switching power supply unit 10, and when the load increases, the frequency (a) changes in the same way as the frequency (b) of the conventional one beyond a certain point of the load. Furthermore, when the switch SW1 is switched off, the frequency is shown by the line (a)'.

Fourth Embodiment

Figure 6:
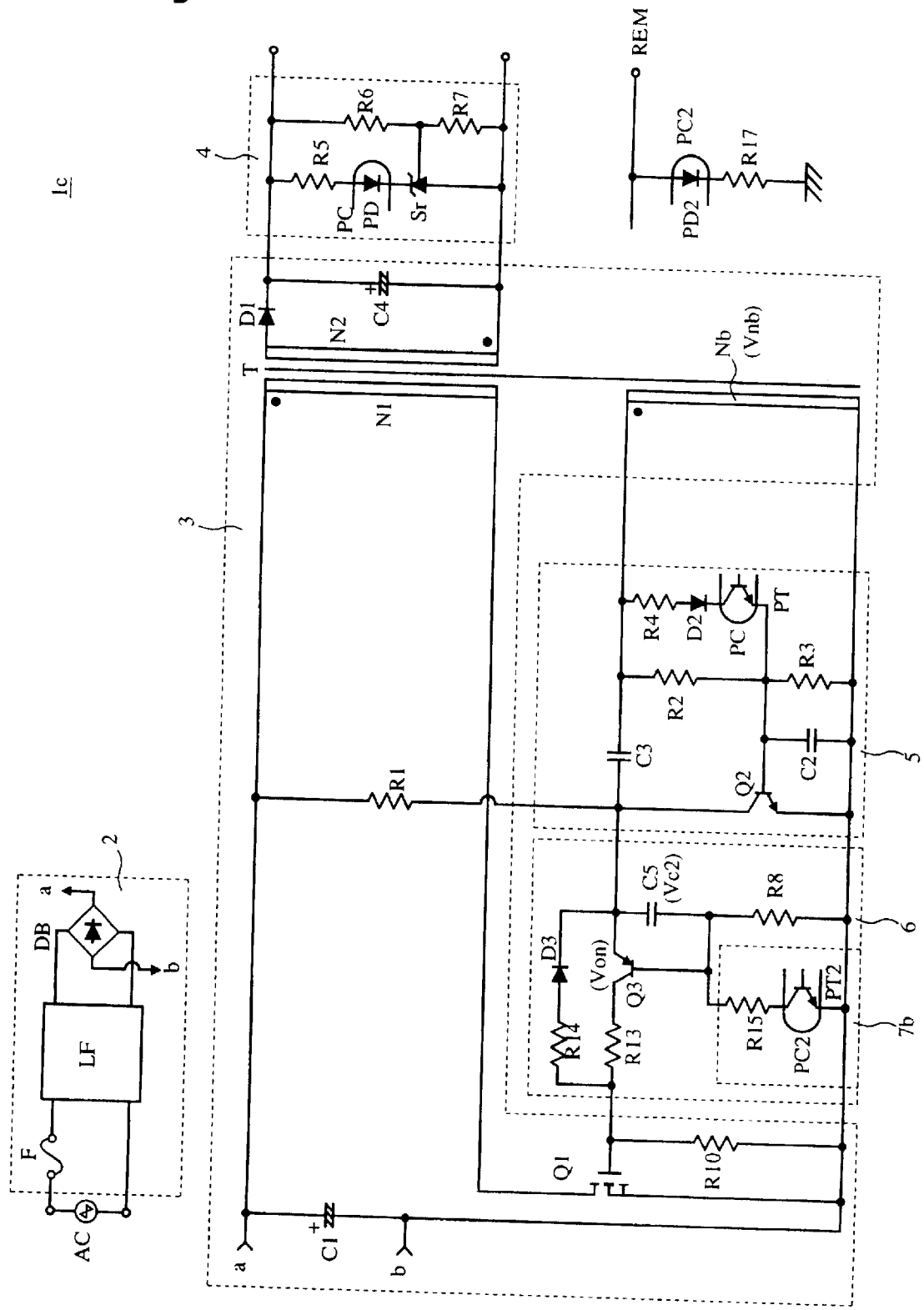
FIG. 6 is a circuit diagram showing a switching power supply unit according to a fourth embodiment of the present invention.

Next, the construction of an RCC type switching power supply unit according to a fourth embodiment of the present invention is described in accordance with FIG. 6. FIG. 6 is a circuit diagram showing the switching power supply unit according to a fourth embodiment of the present invention. In FIG. 6, the delay circuit 6 of the switching power supply unit 1c is constructed in substantially the same way as the delay circuit 6 of the switching power supply unit 1 shown in FIG. 1. Furthermore, a delay-time switching circuit 7b of the switching power supply unit 1c is composed of the resistor R15 and a phototransistor PT2 as part of a photo coupler PC2. A series circuit of the resistor R15 and the phototransistor PT2 is connected so as to be parallel to the resistor R8. That is, one end of the resistor R15 is connected to the connection point of the capacitor C5 and the resistor R8 in the delay circuit 6, and the emitter of the phototransistor PT2 is connected to the source of the FET Q1 in the DC—DC converter circuit 3.

Furthermore, an external remote signal REM is provided to the anode of a light-emitting diode in the photo coupler PC2, and the cathode of the light-emitting diode PD2 is grounded through a resistor R17.

The switching power supply unit 1c constructed in this way operates in the same way as the switching power supply unit 1. That is, when the external remote signal REM is a high signal, the light-emitting diode PD2 lights up and the phototransistor PT2 as a light receiving element is turned on. Thus, the resistor R15 is connected so as to be parallel to the resistor R8, and the time constant of the time constant circuit composed of the capacitor C5 and the resistor R8 changes. Accordingly, when this switching power supply unit 1c is used in the above-mentioned printer, the waiting mode can be changed to the normal operation mode by switching the remote signal to a high signal.

Fifth Embodiment

Figure 7:
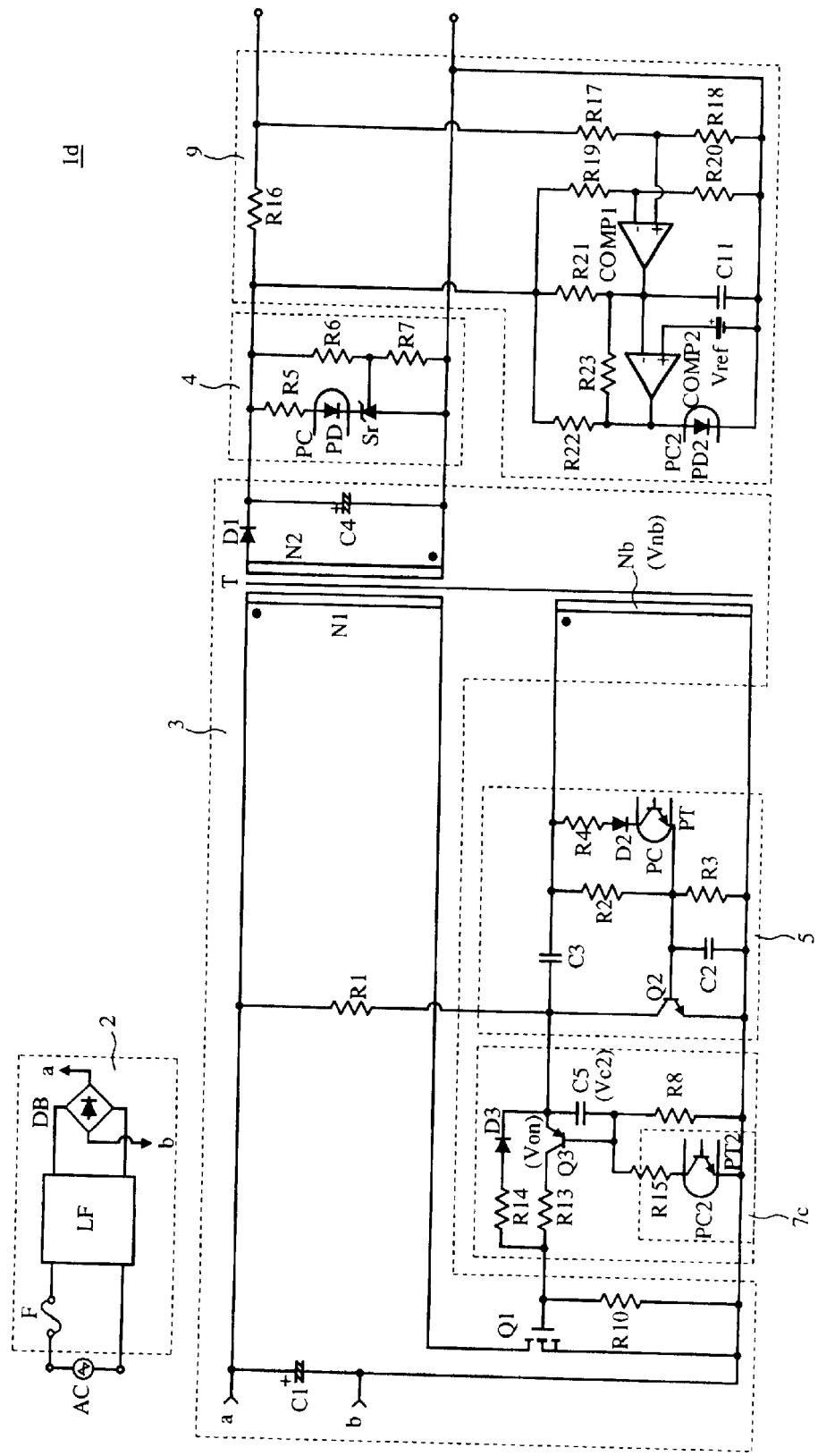
FIG. 7 is a circuit diagram showing a switching power supply unit according to a fifth embodiment of the present invention.

Next, the construction of an RCC type switching power supply unit according to a fifth embodiment of the present invention is described in accordance with FIG. 7. FIG. 7 is a circuit diagram showing the switching power supply unit according to a fifth embodiment of the present invention. In the switching power supply unit 1d shown in FIG. 7, a resistor R16 is provided between the output terminal and one end of the resistor R6 of the voltage detector circuit 4 of the switching power supply unit 1 shown in FIG. 1, and a current detector circuit 9 for detecting the current of the resistor R16 is provided. Furthermore, a phototransistor PT2 as a light receiving element of a photo coupler PC2 provided in the current detector circuit 9 is provided so as to take the place of the switch SW1 in the delay-time switching circuit 7. The current detector circuit 9 is composed of the resistors R16 to R23, the capacitor C11, the comparators COMP1 and COMP2, and the reference voltage Vref. The resistor R16 is connected between the output terminal of the voltage detector circuit 4 and one end of the resistor R6. Between the output terminals of the voltage detector circuit 4, the resistor R17 and the resistor R18 are connected in series. The positive input terminal of the comparator COMP1 is connected to the connection point of the resistor R17 and the resistor R18. A parallel circuit composed of a series circuit of the resistor R19 and the resistor R20, a series circuit of the resistor R21 and the capacitor C11, and a series circuit of the resistor R22 and the photodiode PD2 of the photo coupler PC2 is connected between the connection point of the resistor R16 and the resistor R6 and the starting point of the secondary winding N2 of the transformer T. Moreover, one end of the resistor R22 and the anode of the photodiode PD2 are connected. Furthermore, the negative input terminal of the comparator COMP1 is connected to the connection point of the resistor R19 and the resistor R20. Furthenmore, the output terminal of the comparator COMP1, the negative input terminal of the comparator COMP2, and one end of the resistor R23 are connected to the connection point of the resistor R21 and the capacitor C11. Furthermore, the output terminal of the comparator COMP2 and the other end of the resistor R23 are connected to the connection point of the resistor R22 and the photodiode PD2. The reference voltage Vref is connected to the positive input terminal of the comparator COMP2.

Furthermore, the delay-time switching circuit 7c in the switching power supply unit 1d is constructed in the same way as the delay-time switching circuit 7b in the switching power supply unit 1c shown in FIG. 5 and is composed of the resistor R15 and the phototransistor PT2 of the photo coupler PC2. A series circuit of the resistor R15 and the phototransistor PT2 is connected so as to be parallel to the resistor R8. That is, one end of the resistor R15 is connected to the connection point of the capacitor C5 and the resistor R8 in the delay circuit 6, and the emitter of the phototransistor PT2 is connected to the source of the FET Q1 in the DC—DC converter circuit 3.

Next, the operation of the switching power supply unit 1d constructed as in the above is described. Moreover, here, the main part of the switching power supply unit 1d is described.

When the load of the switching power supply unit 1d changes from the rated load (heavy load) to the standby load (light load) and the output current decreases, the output of the comparator COMP1 in the current detector circuit 9 goes to an open state.

At this time, in the current detector circuit 9, when the voltage of the capacitor C11 in the RC-time-constant circuit rises at a speed to be determined by the time constant and exceeds the reference voltage Vref, the output of the comparator COMP2 becomes a low level signal. Then, the flow of the current in the photodiode PD2 stops, the light-emitting diode PD2 goes off, and the phototransistor PT2 as a light receiving element is turned off. Thus, the time constant becomes unaffected by the resistor R15, and the time constant of the time constant circuit composed of the capacitor C5 and the resistor R8 changes. Therefore, when this switching power supply unit 1d is used in the above-mentioned printer, the normal operation mode changes into the waiting mode because of the output signal of the comparator COMP2 which changes into a low level signal.

When a current detector circuit is provided in the switching power supply unit as described above, an effect can be obtained where, even if the rated load changes into a standby load, the operation mode does not change during a period of time determined by the time constant.

Next, when a waiting load changes into the rated load, the output of the comparator COMP1 in the current detector circuit 9 goes low. When the voltage of the capacitor C11 in the RC time constant circuit decreases and becomes less than or equal to the reference voltage Vref, the output of the comparator COMP2 goes to a high level signal and the waiting mode changes into the normal rated operation mode.

When a current detector circuit is provided in the switching power supply unit, an instantaneous mode change from a waiting load to the rated load takes place and the most appropriate operation can be realized under any load condition.

As described in the above, in the fifth embodiment of the present invention, the modes can be automatically changed by detecting the current of the output load using the current detector circuit. Furthermore, as a timer circuit is provided, any sudden load change can be coped with.

For example, in a printer, the load may quickly change because of the printing, form feed, printer control, etc. When a conventional high-efficiency power supply unit on standby in which modes are automatically changed is used under such a condition, the switching between a waiting mode and the normal operation mode frequently takes place in accordance with the load on the printer side, and accordingly it is required that a switching power supply unit for the printer has good responsiveness. Therefore, as the responsiveness had priority, the switching frequency could not be dynamically lowered.

On the contrary, when a switching power supply unit of the present invention is used in the printer, because the normal operation mode does not change into a waiting mode for a certain period of time even if the printer comes under a waiting load condition, and accordingly the printer operates under the normal operation mode when the load frequently and quickly changes, and, as a result, the switching power supply unit of the invention is reliable. Furthermore, a waiting mode is instantly switched into the normal operation mode, and the load at the time of the switching is often relatively light as in the treatment before printing, etc., and there is no problem in responsiveness.

Moreover, in each of the embodiments of the present invention, the switch and the phototransistor of the photo coupler in the delay-time switching circuit are shown as two-state devices which are operated in either of two conditions, but these are not limited in the present invention. A delay-time switching circuit in which devices to be operated in any of more than two conditions are used may be constructed by combination of a switch, a phototransistor in a photo coupler, etc. In that case, it becomes possible to make a finer adjustment in accordance with the switching frequency.

According to the present invention, the main switching element is prohibited from being turned on for a certain period of time by the delay circuit and an OFF-state period of the oscillation is extended, and also the delay time can be changed in two or more stages by using the switching circuit, and accordingly, when compared with the cases where such a delay circuit is not used, the switching frequency of the main switching element can be lowered, and the switching frequency of the main switching element can be set at a desired frequency by using the switching circuit. Therefore, the increase of the oscillation frequency at a light load and on standby is suppressed, the standby power is suppressed, the heat generation in the main switch is suppressed, or the output ripple voltage caused by the intermittent oscillation can be suppressed.

Furthermore, because the delay circuit including the switching device and the time constant circuit, provided between the feedback winding of the transformer and the control terminal of the main switching element, and the switching circuit for switching the time constant of the time constant circuit are provided, although an ON-state period of time of the switching device changes in accordance with the time constant of the time constant circuit, the time constant of the time constant circuit can be changed by the switching circuit and the efficiency can be greatly improved at light load.

Moreover, because the output power detector circuit in which the voltage of the feedback winding of the transformer is rectified by the rectifying element and is smoothed by the smoothing element and the delay-time extension circuit as the resistor element through which the output power detector circuit is connected to the control terminal of the delay circuit are provided, the turning on of the main switching element is further delayed and the switching frequency of the main switching element can be lowered, and, as a result, the oscillation frequency can be lowered at a light load and the efficiency of the RCC on standby and the output ripple voltage can be improved.

In addition, because the switching circuit can be switched by an external signal, the switching frequency of the main switching element can be easily externally changed.

Furthermore, because the current detector circuit for detecting the current flowing through the secondary winding is provided and further the switching circuit for switching the delay time of the delay circuit after a certain period of time when the current detector circuit detects the load current or the load power on standby is provided, the switching frequency of the main switching element can be automatically changed.

Although the present invention has been described in relation to particular embodiments thereof, many other variations and modifications and other uses will become apparent to those skilled in the art. Therefore, the present invention should be limited not by the specific disclosure herein, but only by the appended claims.

What is claimed is:

1. A ringing choke converter type switching power supply unit comprising:

a transformer having a primary winding, a secondary winding, and a feedback winding;

a main switching element receiving a feedback signal from the feedback winding and which turns the current in the primary winding on and off;

a rectifying and smoothing circuit comprising a rectifying element and a smoothing element, connected to the secondary winding; and a control circuit connected between the feedback winding and a control terminal of the main switching element, a delay circuit for prohibiting the turning on of the main switching element for a certain period of time after the current flowing through the rectifying element has become substantially zero, and a switching circuit for changing the delay time of the delay circuit.

2. The switching power supply unit of claim 1, wherein the delay circuit has a switching device and a time constant circuit which are provided between the feedback winding of the transformer and the control terminal of the main switching element, and wherein the switching circuit switches the time constant of the time constant circuit.

3. The switching power supply unit of claim 1, further comprising:

an output power detector circuit for rectifying and smoothing the voltage of the feedback winding of the transformer by a rectifying element and a smoothing element; and a delay time extension circuit connected between the output power detector circuit and the control terminal of the delay circuit through a resistor element.

4. The switching power supply unit of claim 2, further comprising:

an output power detector circuit for rectifying and smoothing the voltage of the feedback winding of the transformer by a rectifying element and a smoothing element; and a delay time extension circuit connected between the output power detector circuit and the control terminal of the delay circuit through a resistor element.

5. The switching power supply unit of claim 1, wherein the switching circuit can be switched by an external signal.

6. The switching power supply unit of claim 2, wherein the switching circuit can be switched by an external signal.

7. The switching power supply unit of claim 3, wherein the switching circuit can be switched by an external signal.

8. The switching power supply unit of claim 1, further comprising:

a current detector circuit for detecting the current flowing through the secondary winding; and wherein the switching circuit switches the delay time of the delay circuit after a certain period of time when the current detector circuit detects that the load current or load power has changed from a normal load mode to a lower power standby mode.

9. The switching power supply unit of claim 2, further comprising:

a current detector circuit for detecting the current flowing through the secondary winding; and wherein the switching circuit switches the delay time of the delay circuit after a certain period of time when the current detector circuit detects that the load current or load power has changed from a normal load mode to a lower power standby mode.

10. The switching power supply unit of claim 3, further comprising:

a current detector circuit for detecting the current flowing through the secondary winding; and wherein the switching circuit switches the delay time of the delay circuit after a certain period of time when the current detector circuit detects that the load current or load power has changed from a normal load mode to a lower power standby mode.

11. The switching power supply unit of claim 5, further comprising:

a current detector circuit for detecting the current flowing through the secondary winding; and wherein the switching circuit switches the delay time of the delay circuit after a certain period of time when the current detector circuit detects that the load current or load power has changed from a normal load mode to a lower power standby mode.

12. The switching power supply unit of claim 4, wherein the output power detector circuit is coupled across the feedback winding and provides a signal to change a delay time provided by a time constant circuit such that if power dissipated in a load connected to the secondary winding is low, the delay provided by said time constant circuit is increased whereby a turn-on time of said main switching element is delayed, thereby decreasing a switching frequency of said main switching element.

13. The switching power supply unit of claim 1, wherein the switching circuit selects from one of at least two different delay times.

14. The switching power supply unit of claim 13, wherein the switching circuit switches a second resistance in parallel with a first resistance to change the delay time.

15. The switching power supply unit of claim 1, wherein the switching circuit comprises an electronic switch controlled by a external signal determining whether the switching power supply is in a low power standby mode or a high or power normal mode.

16. The switching power supply unit of claim 1, wherein the switching circuit comprises an electronic switch controlled by an output of a current detector circuit coupled to the secondary winding, said current detector circuit sensing an output current of the load and automatically switching said switching circuit between appropriate ones of a low power standby mode and a higher power normal mode in dependence on the sensed output current.

17. The switching power supply unit of claim 16, wherein said current detector circuit switches said switching circuit from standby mode to normal mode substantially without delay and switches said switching circuit from normal mode to standby mode after a delay time.

18. The switching power supply unit of claim 17, wherein said current sensing circuit includes a delay circuit for allowing said switching from said normal mode to said standby mode after said time delay.

19. The switching power supply unit of claim 18, wherein a first comparator is provided for causing switching from said standby mode to said normal mode without substantial delay and a second comparator is provided for causing switching from said normal mode to said standby mode after said time delay.

20. The switching power supply unit of claim 12, wherein the output power detector circuit comprises a rectifying element and a smoothing element coupled to said feedback winding, a connection from said smoothing element being coupled to said time constant circuit.

21. The switching power supply unit of claim 20, whereby said output power detector circuit provides a voltage to said time constant circuit to alter the time required for a capacitor of said time constant circuit to change to a preset voltage.

22. The switching power supply unit of claim 8, wherein the switching circuit changes the delay time when switching from normal mode to standby mode whereby the delay time is increased.

* * * * *